(12) United States Patent
Moldoveanu et al.

(10) Patent No.: US 8,681,581 B2
(45) Date of Patent: Mar. 25, 2014

(54) RANDOMIZATION OF DATA ACQUISITION IN MARINE SEISMIC AND ELECTROMAGNETIC ACQUISITION

(75) Inventors: Nicolae Moldoveanu, Houston, TX (US); Einar Otnes, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 680 days.

(21) Appl. No.: 12/650,319

(22) Filed: Dec. 30, 2009

(65) Prior Publication Data
US 2011/0158042 A1    Jun. 30, 2011

(51) Int. Cl.
*G01V 1/38* (2006.01)
(52) U.S. Cl.
USPC .............................. 367/15; 367/16
(58) Field of Classification Search
USPC .................. 367/15, 16, 19, 130, 117
See application file for complete search history.

(56) References Cited

U.S. PATENT DOCUMENTS

| | | | |
|---|---|---|---|
| 2,693,862 A | 11/1954 | Reiber | |
| 2,823,375 A | 2/1958 | Camp | |
| 3,283,293 A | 11/1966 | Pavey et al. | |
| 3,331,050 A | 7/1967 | Kilmer et al. | |
| 3,506,674 A | 4/1970 | Berger | |
| 3,560,912 A | 2/1971 | Spink et al. | |
| 3,605,674 A | 9/1971 | Weese | |
| 3,774,570 A | 11/1973 | Pearson | |
| 3,806,863 A | 4/1974 | Tilley et al. | |
| 3,921,124 A | 11/1975 | Payton | |
| 3,934,220 A | 1/1976 | Davis | |
| 4,146,870 A | 3/1979 | Ruehle | |
| 4,231,111 A | 10/1980 | Neeley | |
| 4,404,664 A | 9/1983 | Zachariadis | |
| 4,468,663 A | 8/1984 | Kalt | |
| 4,486,863 A * | 12/1984 | French | 367/15 |
| 4,648,080 A | 3/1987 | Hargreaves | |
| 4,669,097 A | 5/1987 | Bristol | |
| 4,757,482 A | 7/1988 | Fiske, Jr. | |
| 4,803,668 A | 2/1989 | Berryhill et al. | |
| 4,834,181 A | 5/1989 | Uhri et al. | |

(Continued)

FOREIGN PATENT DOCUMENTS

| | | | |
|---|---|---|---|
| EP | 0 321705 A2 | 6/1989 | |
| EP | 0 347019 A2 | 12/1989 | |

(Continued)

OTHER PUBLICATIONS

International Search Report and Written Opinion of PCT Application No. PCT/US2010/062419 (10-0956PCTDP) dated Sep. 26, 2011.

(Continued)

*Primary Examiner* — Mark Hellner (57) ABSTRACT

The presently disclosed technique includes a method for use in a marine survey comprising randomizing the distribution of receivers and sources during a coil shoot acquisition. The randomizing can be implemented in a number of ways. For example, in one embodiment, randomizing the distribution includes randomizing the positions of the circle centers defining the sail lines. This may be implemented by, for example, distributing the same number of circle centers as would be used in a non-random sampling in a uniform random distribution. In another embodiment, randomizing the distribution includes permitting the streamers in which the receivers are allowed to drift while controlling crossline streamer separation. Other embodiments may combine these approaches or utilize still other approaches.

17 Claims, 9 Drawing Sheets

(56) References Cited

U.S. PATENT DOCUMENTS

| | | | |
|---|---|---|---|
| 4,942,991 A | 7/1990 | Lyons | |
| 4,960,183 A | 10/1990 | Young, II | |
| 4,965,773 A | 10/1990 | Marschall | |
| 4,970,696 A | 11/1990 | Crews et al. | |
| 4,970,697 A | 11/1990 | Earley et al. | |
| 4,992,990 A | 2/1991 | Langeland et al. | |
| 4,992,991 A | 2/1991 | Young et al. | |
| 5,300,929 A | 4/1994 | MacLeod | |
| 5,353,223 A | 10/1994 | Norton et al. | |
| 5,430,689 A | 7/1995 | Rigsby et al. | |
| 5,443,027 A | 8/1995 | Owsley et al. | |
| H1490 H | 9/1995 | Thompson et al. | |
| 5,508,973 A | 4/1996 | Mallick et al. | |
| 5,555,531 A | 9/1996 | Booth et al. | |
| 5,668,775 A | 9/1997 | Hatteland | |
| 5,677,893 A | 10/1997 | de Hoop et al. | |
| 5,761,152 A | 6/1998 | Jacobsen et al. | |
| 5,973,995 A | 10/1999 | Walker et al. | |
| 6,044,040 A | 3/2000 | Holland | |
| 6,061,301 A | 5/2000 | Corrigan | |
| 6,175,809 B1 | 1/2001 | Naville | |
| 6,178,381 B1 | 1/2001 | Padhi et al. | |
| 6,285,956 B1 | 9/2001 | Bennett et al. | |
| 6,292,754 B1 | 9/2001 | Thomsen | |
| 6,343,256 B1 | 1/2002 | Winbow et al. | |
| 6,477,111 B1 | 11/2002 | Lunde et al. | |
| 6,525,992 B1 | 2/2003 | Olivier et al. | |
| 6,529,832 B1 | 3/2003 | Kerekes | |
| 6,553,315 B2 | 4/2003 | Kerekes et al. | |
| 6,590,831 B1 | 7/2003 | Bennett et al. | |
| 6,671,223 B2 | 12/2003 | Bittleston | |
| 6,684,160 B1 | 1/2004 | Ozbek et al. | |
| 6,691,038 B2 | 2/2004 | Zajac | |
| 6,714,873 B2 | 3/2004 | Bakulin et al. | |
| 6,837,175 B1 | 1/2005 | Gieseke | |
| 6,847,896 B1 | 1/2005 | Orban et al. | |
| 6,862,531 B2 | 3/2005 | Horne et al. | |
| 6,865,487 B2 | 3/2005 | Charron | |
| 6,932,017 B1 | 8/2005 | Hillesund et al. | |
| 6,944,094 B1 | 9/2005 | Thomsen et al. | |
| 7,065,449 B2 | 6/2006 | Brewster et al. | |
| 7,080,607 B2 | 7/2006 | Hillesund et al. | |
| 7,203,130 B1 | 4/2007 | Welker | |
| 7,239,577 B2 | 7/2007 | Tenghamn et al. | |
| 7,293,520 B2 | 11/2007 | Hillesund et al. | |
| 7,377,224 B2 | 5/2008 | Ryan et al. | |
| 7,391,673 B2 | 6/2008 | Regone et al. | |
| 7,400,552 B2 | 7/2008 | Moldoveanu et al. | |
| 7,403,448 B2 | 7/2008 | Welker et al. | |
| 7,679,990 B2 | 3/2010 | Herkenhoff et al. | |
| 7,952,522 B2 | 5/2011 | Hohl | |
| 7,965,583 B2 | 6/2011 | Thomas | |
| 2002/0193947 A1 | 12/2002 | Chamberlain | |
| 2003/0067842 A1 | 4/2003 | Sukup et al. | |
| 2003/0125878 A1 | 7/2003 | Bakulin et al. | |
| 2004/0042341 A1 | 3/2004 | Tenghamn et al. | |
| 2004/0066707 A1 | 4/2004 | Tenghamn et al. | |
| 2004/0125697 A1 | 7/2004 | Fleming | |
| 2004/0240319 A1 | 12/2004 | Carvill et al. | |
| 2005/0018537 A1 | 1/2005 | Welker et al. | |
| 2005/0180260 A1 | 8/2005 | Planke et al. | |
| 2005/0180263 A1 | 8/2005 | Lambert et al. | |
| 2005/0194201 A1 | 9/2005 | Tenghamn et al. | |
| 2006/0215489 A1 | 9/2006 | Solheim et al. | |
| 2006/0227657 A1 | 10/2006 | Tveide et al. | |
| 2006/0239117 A1 | 10/2006 | Singh et al. | |
| 2006/0256653 A1 | 11/2006 | Toennessen et al. | |
| 2006/0256654 A1 | 11/2006 | Paulsen | |
| 2006/0285435 A1 | 12/2006 | Robertsson | |
| 2007/0064526 A1 | 3/2007 | Holo | |
| 2007/0104028 A1 | 5/2007 | Van Manen et al. | |
| 2007/0127312 A1 | 6/2007 | Storteig et al. | |
| 2007/0159921 A1 | 7/2007 | Regone et al. | |
| 2007/0165486 A1 | 7/2007 | Moldoveanu et al. | |
| 2007/0274153 A1 | 11/2007 | Bisley et al. | |
| 2008/0267010 A1 | 10/2008 | Moldoveau et al. | |
| 2008/0285380 A1* | 11/2008 | Rouquette | 367/15 |
| 2008/0285381 A1 | 11/2008 | Moldoveanu et al. | |
| 2009/0122640 A1 | 5/2009 | Hill et al. | |
| 2009/0245019 A1 | 10/2009 | Falkenberg et al. | |
| 2009/0262601 A1 | 10/2009 | Hillesund et al. | |
| 2009/0310439 A1 | 12/2009 | Hauan et al. | |
| 2009/0310440 A1 | 12/2009 | Solheim et al. | |
| 2009/0316525 A1 | 12/2009 | Welker | |
| 2010/0013485 A1 | 1/2010 | Alumbaugh et al. | |
| 2010/0027374 A1 | 2/2010 | Moldoveanu et al. | |
| 2010/0118645 A1 | 5/2010 | Welker et al. | |
| 2010/0142317 A1 | 6/2010 | Moldoveanu et al. | |
| 2010/0238762 A1 | 9/2010 | Hornbostel | |
| 2011/0158041 A1 | 6/2011 | Moldoveanu et al. | |

FOREIGN PATENT DOCUMENTS

| | | |
|---|---|---|
| EP | 0 613025 A1 | 8/1994 |
| EP | 0 613025 B1 | 9/1998 |
| EP | 0 681193 B1 | 8/1999 |
| GB | 2144854 A | 3/1985 |
| GB | 2342081 A | 4/2000 |
| GB | 2390902 A | 1/2004 |
| GB | 2436206 A | 9/2007 |
| WO | 8403153 A1 | 8/1984 |
| WO | 9621163 A1 | 7/1996 |
| WO | 9828636 A1 | 7/1998 |
| WO | 0020895 A1 | 4/2000 |
| WO | 0129580 A1 | 4/2001 |
| WO | 2004092771 A2 | 10/2004 |
| WO | 2005062075 A1 | 7/2005 |
| WO | 2006014750 A2 | 2/2006 |
| WO | 2007070499 A2 | 6/2007 |

OTHER PUBLICATIONS

Hennenfent, et al., Random Sampling: New Insights into the Reconstruction of Coarsely-Sampled Wavefields, SEG 2007 Annual Meeting.

Hennenfent, et al., Simply Denoise: Wavefield Reconstruction Via Jittered Undersampling, Geophysics, May-Jun. 2008, pp. V19-V28, vol. 73, No. 3.

Wong, et al., Sampling with Hammersley and Halton Points, Jounal of Graphics Toolsm 1997.

Beasley, et al.; A New Look at Simultaneous Sources; SEG Expanded Abstracts; 1998.

Moldoveanu; "Circular Geometry for Wide-Azimuth Towed-Streamer Acquisition"; EAGE; Jun. 2008.

Hennenfent, et al.; "Simply Denoise: Wavefield Reconstructions via Jittered Undersampling"; Geophysics; vol. 73(2); pp. v19-v28; May-Jun. 2008.

Hennenfent, et al.; "Random Sampling: New Insights into the Reconstruction of Coarsely-Sampled Wavefields"; SEG Annual Meeting; pp. 2575-2579; Oct. 2007.

WesternGeco Q-Technology URL: http://www.westerngeco.com/content/services/q_technology/index.asp 2006.

Bacon, et al.; "3-D Seismic Interpretation"; Cambridge University Press; pp. 18-22 and 25-26; 2003.

Sukup; "Wide Azimuth Marine Acquisition by the Helix Method"; The Leading Edge; pp. 791-794; Aug. 2002.

Pan; "Single-Sensor Towed Streamer Improves Seismic Acquisition"; Offshore; Apr. 2002.

Wong, et al.; "Sampling with Hammersley and Halton Points"; 2 Journal of Graphics Tools; pp. 9-24; 1997.

Reilly, et al; "Concentric Circle 3D: Optimization of Salt Diapir Flank Imaging UK Central North Sea"; First Break; vol. 12, No. 9; pp. 463-475; Sep. 1994.

Cole, et al.; "A Circular Seismic Acquisition Technique for Marine Three Dimensional Surveys"; Offshore Technology Conference, 4864; Houston, Texas; May 6-9, 1985.

PCT Search Report and Written Opinion; PCT/US2010/035063; Dec. 29, 2010.

PCT Search Report and Written Opinion; PCT/US2009/060864; May 1, 2010.

(56) References Cited

OTHER PUBLICATIONS

PCT Search Report and Written Opinion; PCT/US2009/063538; Apr. 30, 2010.

PCT Search Report and Written Opinion; PCT/US2009/047015; Feb. 24, 2010.

PCT Search Report and Written Opinion; PCT/US2009/047019; Jan. 7, 2010.

PCT Search Report and Written Opinion; PCT/US2009/045261; Dec. 23, 2009.

PCT Search Report and Written Opinion; PCT/US2008/063875; Sep. 16, 2009.

UKIPO examination report (Aug. 10, 2009) and search report (Aug. 7, 2009) for GB 0912870.3.

Moldoveanu, et al; Full Azimuth Imaging Using Circular Geometry Acquisition; Leading Edge; vol. 27, No. 7; pp. 908-913; Jul. 2008.

PCT Search Report and Written Opinion; PCT/US2009/031396; May 14, 2009.

IPAU Examination Report (Jun. 21, 2012); AU 2008254856.

SIPO Rejection Decision (Jun, 6, 2012) and SIPO Office Actions (Feb. 6, 2012 and Jul. 20, 2011); CN 200880021257.8.

Mexican associate reportings dated Jul. 2012, Oct. 2011, and Apr. 2011 for IMPI Office Actions; MX/a/2009/012362.

UKIPO Examination Reports (May 18, 2012 and Feb. 13, 2012); GB 1019199.7.

Mexican associate reportings dated Aug. 2012 and Mar. 2012 for IMPI Office Actions; MX/a/2010/013018.

IPAU Examination Report (May 16, 2008); AU 2006252148.

SIPO Office Action (Nov. 19), 2010; CN 200710003980.0.

UKIPO Examination Reports (Jun. 8, 2010, Mar. 17, 2010, Nov. 13, 2009, Aug. 10, 2009, and Feb. 6, 2009) and UKIPO Search Report (Jul. 18, 2007); GB 0700970.9.

Mexican associate reporting dated Jun. 2009 for IMPI Office Action; PA/a/2007/000733.

\* cited by examiner

RANDOMIZATION OF DATA ACQUISITION IN MARINE SEISMIC AND ELECTROMAGNETIC ACQUISITION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention pertains to towed array marine seismic surveys, and, more specifically, to an acquisition technique during a coil shoot.

2. Description of the Related Art

This section of this document introduces various aspects of the art that may be related to various aspects of the present invention described and/or claimed below. It provides background information to facilitate a better understanding of the various aspects of the present invention. As the section's title implies, this is a discussion of "related" art. That such art is related in no way implies that it is also "prior" art. The related art may or may not be prior art. The discussion in this section of this document is to be read in this light, and not as admissions of prior art.

The performance of a marine seismic acquisition survey typically involves one or more vessels towing at least one seismic streamer through a body of water believed to overlie one or more hydrocarbon-bearing formations. WesternGeco L.L.C. currently conducts high-resolution Q-Marine™ surveys, in some instances covering many square kilometers. In many areas of the world hydrocarbon reservoirs located in structurally complex areas may not be adequately illuminated even with advanced towed marine streamer acquisition methods.

For example, the shallow, structurally complex St. Joseph reservoir off Malaysia produces oil and gas in an area that poses many surveying and imaging challenges. Strong currents, numerous obstructions and infrastructure, combined with difficult near-surface conditions, may hinder conventional survey attempts to image faults, reservoir sands, salt domes, and other geologic features.

A survey vessel known as a Q-Technology™ vessel may conduct seismic surveys towing multiple, 1000-10,0000-meter cables with a separation of 25-50 meters, using the WesternGeco proprietary calibrated Q-Marine™ source. "Q" is the WesternGeco proprietary suite of advanced seismic technologies for enhanced reservoir location, description, and management. For additional information on Q-Marine™, a fully calibrated, point-receiver marine seismic acquisition and processing system, as well as Q-Land™ and Q-Seabed™, see http ://www.westerngeco.com/q-technology.

To achieve high density surveys in regions having a combination of imaging and logistical challenges, a high trace density and closely spaced streamers may be used. However, this presents the potential of entangling and damaging streamer cables and associated equipment, unless streamer steering devices are closely monitored and controlled. Wide-azimuth towed streamer survey data is typically acquired using multiple vessels, for example: one streamer vessel and two source vessels; two streamer vessels and two source vessels; or one streamer vessel and three source vessels. Many possible marine seismic spreads comprising streamers, streamer vessels, and source vessels may be envisioned for obtaining wide- or rich-azimuth survey data.

Assignee's co-pending application Ser. No. 11/335,365, filed Jan. 19, 2006 discusses some of these. This document discusses shooting and acquiring marine seismic data during turns of linear marine surveys and during curvilinear paths. While an advance in the art, the art continues to seek improvements to marine seismic data acquisition techniques.

The seismic wavefield W generated in seismic surveys is a function of seven independent variables:

$$W=W(t,X_r,Y_r,Z_r,X_s,Y_sZ_s)$$

where:

t=time;

$X_r$=receiver sampling in the inline direction, or in the direction of the length of the streamer;

$Y_r$=receiver sampling in crossline direction perpendicular to the inline direction;

$Z_r$=receiver sampling in depth;

$X_s$=source sampling in the inline direction, or in the direction of the length of the streamer;

$Y_s$=source sampling in crossline direction perpendicular to the inline direction; and $Z_s$=source sampling in depth.

Conventional towed streamer acquisition in 2D, 3D, or wide-azimuth ("WAZ") surveys is a parallel geometry, i.e., the receiver and the source lines are parallel. In towed streamer parallel marine acquisition the receiver are well sampled in the inline direction and not very well sampled in the crossline direction. For example, the inline receiver sampling might be 3.125 m to 12.5 m whereas the crossline receiver sampling might be 50 m to 200 m. The sources are also better sampled in the inline direction but poorly sampled in the crossline direction. So, inline source sampling might be 18.75 m to 150 m where crossline source sampling is 250 m to 600 m.

One characteristic of parallel geometry is that the data is regularly sampled because the sources and receivers are distributed in a regular grid. For marine towed streamer acquisition the planned (pre-plot) receiver locations can differ from the actual (post-plot) receiver locations despite efforts to control their position due to the effect of marine currents on the streamers. However, the source locations are always very regularly distributed.

This is important because, as one of the bedrock principles of seismic survey design, the sampling must meet what is known in the art as the "Nyquist criteria." However, recent theoretical studies have shown that, if the seismic data is not sampled according to the Nyquist criteria (which is currently always the case in marine acquisition), it is better to have the data randomly sampled. Recently established principles of "compressive sampling" or "compressed sensing", prove that reconstruction of images or signals can be done accurately with a smaller number of samples that required by Nyquist theory.

Recent research in theoretical application of compressive sampling to seismic data shows the potential benefits of random sampling for the reconstruction of seismic wavefields, Gilles Hennenfent & Felix J. Herrmann, "Random Sampling: New Insights Into the Reconstruction of Coarsely-Sampled Wavefields" SEG/San Antonio 2007 Annual Meeting, pp. 2575-2579 (2007), and for noise attenuation, Gilles Hennenfent & Felix J. Herrmann, "Simply Denoise: Wavefield Reconstruction Via Jittered Undersampling" 73 Geophysics V19-V28. (2008). However, nobody has yet achieved a mechanism by which such random sampling can be sufficiently achieved during an actual survey.

The art has also begun to develop an alternative to the conventional parallel geometry during acquisition. This was first suggested by Cole, R. A. et al., "A circular seismic acquisition technique for marine three dimensional surveys", Offshore Technology Conference, OTC 4864, May 6-9, 1985, Houston, Tex., described a concentric circle shooting scheme for obtaining three dimensional marine survey data around a sub-sea salt dome. While perhaps useful when the location of the feature under survey is known, this technique would not be efficient or productive for finding new oil and gas deposits, or for monitoring changes in same if such information is desired.

A great leap in acquisition technology was described in another assignee's co-pending application, Ser. No. 12/121, 324, filed on May 15, 2008. This reference describes methods for efficiently acquiring wide-azimuth towed streamer seismic data, which is also known as the "coil shooting" technique.

While the Q suite of advanced technologies for marine seismic data acquisition and processing may provide detailed images desired for many reservoir management decisions, including the ability to acquire wide- and/or rich azimuth data, the ability to acquire higher quality marine seismic data with less cost, or to increase the fold while also increasing the diversity of azimuth and offset, are constant goals of the marine seismic industry and would be viewed as advances in the art.

SUMMARY OF THE INVENTION

The presently disclose marine survey technique includes, in various aspects, a method and apparatus for use in a marine survey. The method comprises randomizing the distribution of receivers and sources during a marine survey acquisition. The apparatus is a marine survey system. The marine survey system comprises: a plurality of sources; a plurality of receivers; at least one survey vessel towing at least one of the sources and the receivers; and at least one controller aboard the survey vessel. In operation, the controller controls the marine survey system during a survey in which the distribution of receivers and sources is randomized during an acquisition.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

A rich- or wide-azimuth towed streamer survey may be acquired in accordance with the present invention using a single streamer vessel comprising multiple streamers and a minimum of one source array. In certain embodiments the methods include positioning of streamers and/or sources employing positioning apparatus or systems (for example satellite-based systems), one or more streamer steering devices, one or more source array steering devices, and/or one or more noise attenuation apparatus or systems. One system, known as Q-Marine™, includes these features and may be useful in methods of the invention.

It has recently been discovered that coil acquisition geometry can be considered a geometry that provides random sampling of the seismic data if performed with random receiver distribution and random shot distribution. The presently disclosed technique is a method for use in a towed array marine seismic survey comprising randomizing the distribution of seismic receivers and seismic sources during a coil shoot acquisition. The randomizing can be implemented in a number of ways. For example, in one embodiment, randomizing the distribution includes randomizing the positions of the circle centers defining the sail lines. This may be implemented by, for example, distributing the same number of circle centers as would be used in a non-random sampling in a uniform random distribution. In another embodiment, randomizing the distribution includes permitting the streamers in which the seismic receivers are allowed to drift while controlling crossline streamer separation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Turning now to the drawings, the presently disclosed technique employs a seismic spread including a plurality of survey vessels, at least one receiver array, and a plurality of source arrays (or, "sources"). To further an understanding of the present invention, one particular embodiment of the streamer arrays will now be disclosed with respect to FIG. 1A-FIG. 1D.

The spread comprises at least one, and typically a plurality, of vessels that may be categorized by the type of sensors they tow. Some vessels may be referred to as "receiver vessels" in that they tow a respective streamer array, although they may also tow a respective source. For example, the survey vessel 100 in FIG. 1A and the survey vessel 101 in FIG. 1B are "receiver vessels" because they each tow a respective receiver array 105. Because the survey vessel 100 in FIG. 1A also tows a source 110, it is sometimes called a "streamer/source" vessel or a "receiver/source" vessel. The receiver vessel 101 in FIG. 1B omits source and may sometimes be called "streamer only" vessel because it only tows streamers. The vessel 102 in FIG. 1C is a "source vessel" in that it tows only a respective source 110 but no streamers, that is it tows the seismic sources 110 to the exclusion of any streamer arrays. The vessels 102 may also sometimes be called a "source only" vessel.

Figure 1A:
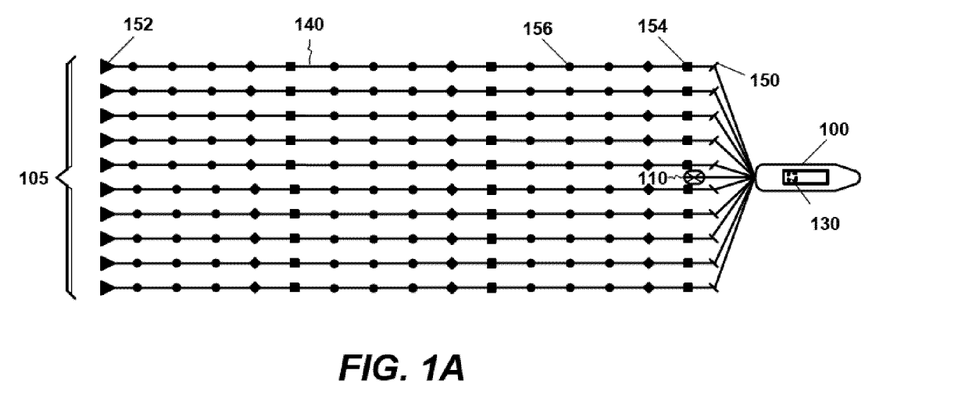
FIG. 1A-FIG. 1D depict particular implementations of spread elements as may be used in various embodiments of the present invention.
Figure 1B:
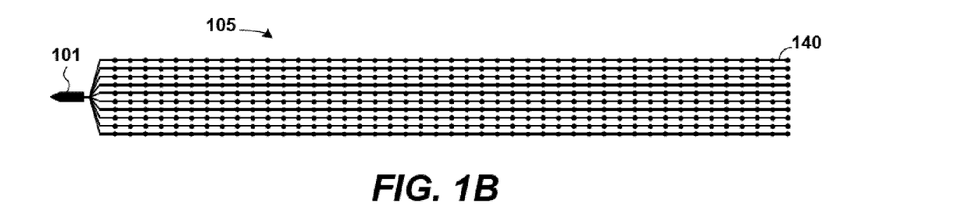
Figure 1C:
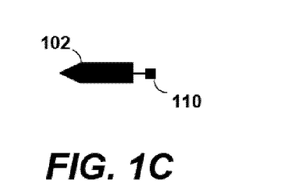

Focusing on FIG. 1A now, the drawing depicts one particular embodiment of the survey vessel 100, streamer array 105, and seismic source 110 in a plan, overhead view. On board the survey vessel 100 is a computing apparatus 130. The computing apparatus 130 performs two functions. A first function is navigation control, in which the computing apparatus is programmed with the sail lines of the survey vessel 100 that define the survey. A second function is array control in which it controls the streamer array 105 and the source 110 in a manner well known and understood in the art, sometimes modified as described herein. In some embodiments, the computing apparatus 130 may comprise multiple computers. The towed array 105 comprises ten streamers 140 (only one indicated). The number of streamers 140 in the towed array 105 is not material to the practice of the invention.

The present invention admits wide variation in the implementation of the streamers 140. As will be discussed further below, the streamers 140 are "multicomponent" streamers as will be discussed further below. Examples of suitable construction techniques may be found in U.S. Pat. Nos. 6,477,711, 6,671,223, 6,684,160, 6,932,017, 7,080,607, 7,293,520, and U.S. application Ser. No. 11/114,773. Any of these alternative multicomponent streamers may be used in conjunction with the presently disclosed technique. However, the invention is not limited to use with multicomponent streamers and may be used with conventional, pressure-only streamers used in 2D surveys.

At the front of each streamer 140 is a deflector 150 (only one indicated) and at the rear of every streamer 140 is a tail buoy 152 (only one indicated) used to help control the shape and position of the streamer 140. Located between the deflector 150 and the tail buoy 152 are a plurality of seismic cable positioning devices known as "birds" 154. In this particular embodiment, the birds 154 are used to control the depth at which the streamers 140 are towed, typically a few meters.

The streamers 140 also include a plurality of instrumented sondes 156 (only one indicated) distributed along their length. The instrumented sondes 156 house, in the illustrated embodiment, an acoustic sensor 160 (e.g., a hydrophone) such as is known to the art, and a particle motion sensor 162, both conceptually shown in FIG. 1D. The particle motion sensors 162 measure not only the magnitude of passing wavefronts, but also their direction. The sensing elements of the particle motions sensors may be, for example, a velocity meter or an accelerometer.

Figure 1D:
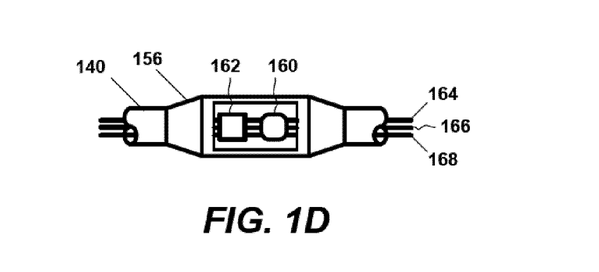

The sensors of the instrumented sondes 156 then transmit data representative of the detected quantity over the electrical leads of the streamer 140 to the computing apparatus 130. The streamer 140 in this particular embodiment provides a number of lines (i.e., a power lead 164, a command and control line 166, and a data line 168) over which signals may be transmitted. Furthermore, the streamer 140 will also typically include other structures, such as strengthening members (not shown), that are omitted for the sake of clarity.

The relative positions of the survey vessels described above, as well as the shape and depth of the streamers 140, may be maintained during the survey using control techniques known to the art, depending on the embodiment. Where such control is exerted, any suitable technique known to the art may be used. Suitable techniques include those disclosed in U.S. Pat. No. 6,671,223, U.S. Pat. No. 6,932,017, U.S. Pat. No. 7,080,607, U.S. Pat. No. 7,293,520, and U.S. application Ser. No. 11/114,773.

Still referring to FIG. 1A, the source 110 typically will be implemented in arrays of individual sources. The source 110 may be implemented using any suitable technology known to the art, such as impulse sources like explosives, air guns, and vibratory sources. One suitable source is disclosed in U.S. Pat. No. 4,657,482, incorporated by reference below. The embodiment illustrated in FIG. 1A simultaneously shoots several of the individual sources in the array of the source 110. Accordingly, care should be taken so that their signals can be separated during subsequent analysis.

There are a variety of techniques known to the art for source separation and any such suitable technique may be employed. Source separation may be achieved by a source encoding technique in which one source is coherent and another source is incoherent in a certain collection domain, such as common depth point, common receiver or common offset. Another way source separation technique is disclosed in C. Beasley & R. E. Chambers, 1998, "A New Look at Simultaneous Sources", 60$^{th}$ Conference and Exhibition, EAGE, Extended Abstracts, 02-38.

The various elements of the survey described above may be implemented using any suitable techniques known to the art. The illustrated embodiment uses WesternGeco Q-Marine technology that provides features such as streamer steering, single-sensor recording, large steerable calibrated source arrays, and improved shot repeatability, as well as benefits such as better noise sampling and attenuation, and the capability to record during vessel turns, all contribute to the improved imaging. More particularly, each of the vessels 100-103 is a Q™ vessel owned and operated by WesternGeco, the assignee hereof. Each vessel 100-103 is provided with a GPS receiver coupled to an integrated computer-based seismic navigation (TRINAV™), source controller (TRISOR™), and recording (TRIACQ™) system (collectively, TRILOGY™), none of which are separately shown. The sources 131-134 are typically TRISOR™-controlled multiple air gun sources.

The spread elements described above are deployed in a manner suitable for acquiring seismic data in what is known as a "coil", as opposed to a "straight line" or "parallel geometery", shoot. The spread may be a single vessel spread or a multi-vessel spread. Coil shooting using a single vessel spread is generally described in more detail in assignee's co-pending application, Ser. No. 12/121,324, filed on May 15, 2008 incorporated by reference below. Multi-vessel coil shooting generally described in more detail in assignee's co-pending application, Ser. No. 12/650,268, filed on an even date herewith incorporate by reference below. However, the teachings of each of these references are modified as described below to implement the presently disclosed technique.

Coil shooting differs from conventional straight line acquisition in that the survey vessels traverse the survey on a generally curved advancing path. As illustrated in the computer rendition of FIG. 2C, rich azimuth and offset distribution is collected. A very high fold may also be obtained. As used herein the phrase "generally curved advancing path" means that the vessels and streamers travel generally in a curve, and there is an advancement in one or more of the X and Y directions, as explained further herein. The path may be expressed as a coil. The curve may be circular, oval, elliptical, FIG. 8, or other curved path.

Figure 2A:
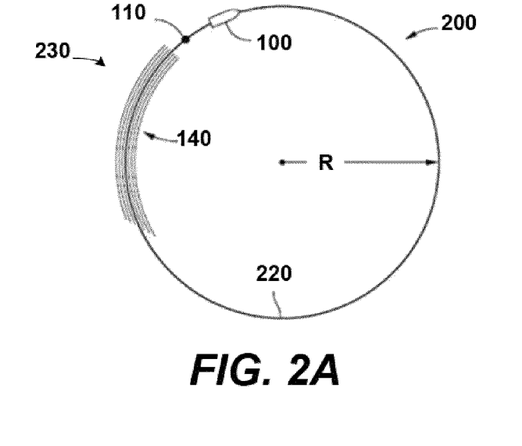
FIG. 2A-FIG. 2C are a plan, overhead schematic view of one particular embodiment of a single vessel coil shoot, a computerized rendition of a plan view of the survey area covered by generally circular sail lines of the embodiment of FIG. 2A over time during a shooting and recording survey, and an azimuth-offset plot for such a survey, respectively.
Figure 2B:
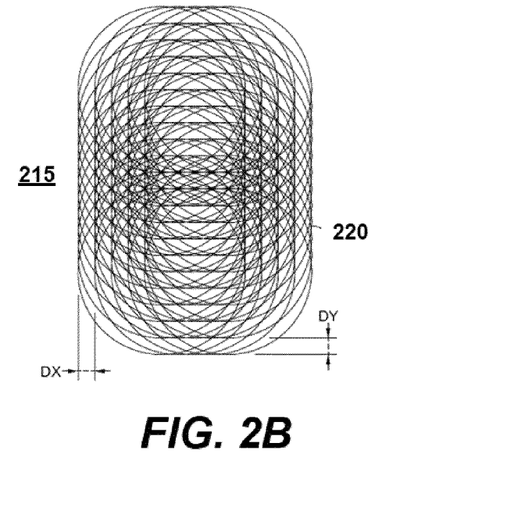
Figure 2C:
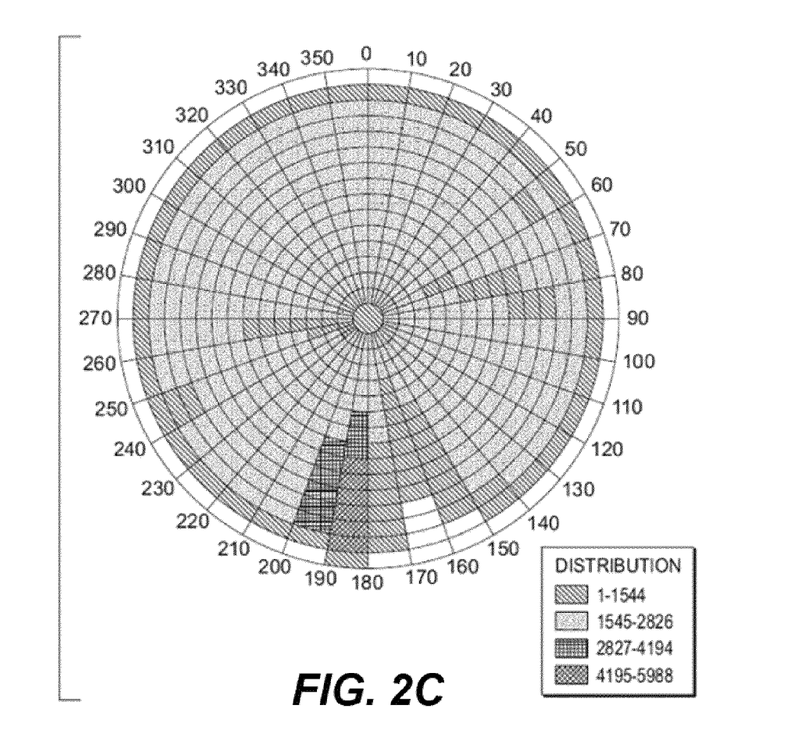

FIG. 2A-FIG. 2C illustrate one particular embodiment of a single vessel coil shoot. FIG. 2A-FIG. 2B are a plan, overhead schematic view of one particular embodiment of a single vessel coil shoot 200 and a computerized rendition 210 of a plan view of the survey area 215 covered by generally circular sail lines 220 of the embodiment of FIG. 2A over time during a shooting and recording survey, respectively. FIG. 2A more particularly depicts the generally curved advancing path or sail lines 220 of a seismic source 110 and streamers 140 generally circular as illustrated by the heavy dark line. In this embodiment both the streamers 140 and the wide- or rich-azimuth source 110 are towed by the same vessel 100, although this is not required. In other words, the streamers 140 generally follow the circular sail line 220 having a radius R, where R may range from about 5,500 m to 7,000 m or more.

The sail line or path 220 is not truly circular, as once the first pass is substantially complete, the spread 230 will move slightly in the y-direction (vertical) value of DY, as illustrated in FIG. 2B. The spread may also move in the x-direction (horizontal) by a value DX. Note that "vertical" and "horizontal" are defined relative to the plane of the drawing. The Q™ technology implementation can perform this task because at least to the following features: accurate positioning system; streamer steering; and advance noise attenuation capabilities due to single sensor acquisition and fine sampling.

FIG. 2B is a computerized rendition of a plan view of the survey area covered by the generally circular sail lines 220 of the seismic spread 230 and method of FIG. 2A over time during a shooting and recording survey, where the displacement from circle to circle is DY in the vertical direction and DX in the horizontal direction. In FIG. 2B, note that several generally circular sail lines 220 (only one indicated) cover the survey area. In this example, the first generally circular sail line was acquired in the southeast ("SE") corner of the survey. When a first generally circular sail path 220 is completed the vessel 100 (shown in FIG. 2A) moves along the tangent with a certain distance, DY, in vertical direction, and starts a new generally circular path 220. Several generally circular curved paths 220 may be acquired until the survey border is reached in the vertical direction. A new series of generally circular paths 220 may then be acquired in a similar way, but the origin will be moved with DX in the horizontal direction. This way of shooting continues until the survey area is completely covered.

The design parameters for practicing methods within the invention include the radius R of the circle, the radius being a function of the spread width and also of the coverage fold desired; DY, the roll in the y-direction; DX, the roll in the x-direction. DX and DY are functions of streamer spread width and of the coverage fold desired to be acquired. The radius R of the circle may be larger than the radius used during the turns and is a function of the streamer spread width. The radius R may range from about 5 km to about 10 km. The radius R ranges from 6 km to 7 km in one particular embodiment.

The total number of kilometers acquired over a given area depends on the circle radius R and the values DX and DY. The total number of shots acquired with the coil shooting technique disclosed herein increases with increased radius R. DX and DY may range from about 0.5 W to about 2 W, or from about 0.5 W to about W, where W is the streamer spread width. Certain embodiments where DX=DY=W give a continuity of the surface receiver coverage. Certain embodiments wherein DX=DY=0.5 W give a continuity in subsurface midpoint coverage. The values of DX and DY may be the same or different and may each range from about 500 m to about 1200 m or more. The value of DX and DY may be selected based on the survey objectives. For instance for a development type survey DX and DY should be smaller than for an exploration survey. Also, as DX and DY determine the source sampling, processing requirements should be considered when the survey is designed.

Figure 3A:
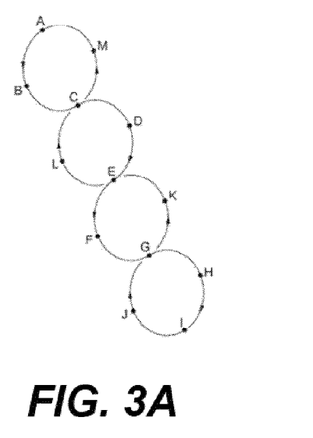
FIG. 3A-FIG. 3C illustrate various alternative coil shoot sail lines alternative to those shown in FIG. 2A-FIG. 2B for a coil shoot.
Figure 3B:
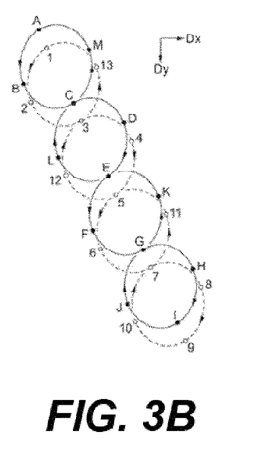

Another possibility is for a streamer vessel 100 and at least one source vessel 102 to follow a generally closed curve as illustrated schematically in FIG. 3A. The vessels themselves are not shown in FIG. 3A, only their generally advancing paths. The streamer vessel advances on a general closed curve passing through the following points: A, B, C, D, E, F, G, H, I, J, G, K, E, L, C, M, A. The streamer vessel starts at point A and returns to the same point. Once finished with the first path, the spread may move from point A a certain distance DX, in the x-direction, and DY, in the y-direction and a new curve will start as illustrated schematically in FIG. 3B. FIG. 3B is an example of two closed curves that are separated by DX and DY distances. The way points of the second path are 1, 2, 3, 4, 5, 6, 7, 8, 9, 10, 11, 12, 13, 1.

Figure 3C:
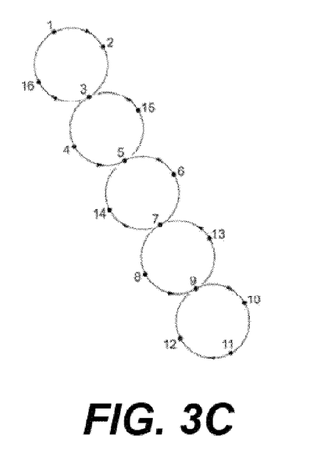

The closed curve could be generated as a series of tangent circles as illustrated schematically in FIG. 3C. In this method, of coil shooting acquisition, the streamer vessel traverses half of a circle and moves to the next circle ("figure 8" pattern) until the survey limit is reached. Then the vessel will traverse in reverse direction acquiring the other semi-circumferences. The next series of circles will be shifted with DX and DY in x-direction and respectively, y-direction. The extent of closed curve in one direction and the total number of closed curves acquired over an area depend on the survey size.

Figure 4A:
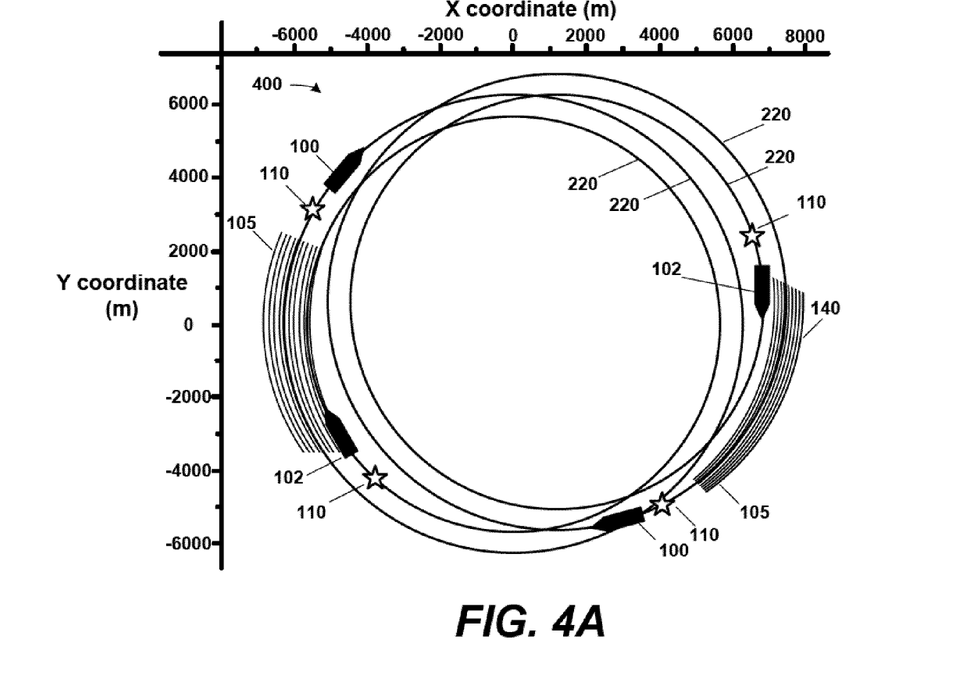
FIG. 4A-FIG. 4C are a plan, overhead schematic view of one particular embodiment of a single vessel coil shoot, a computerized rendition of a plan view of the survey area covered by generally circular sail lines of the embodiment of FIG. 4A over time during a shooting and recording survey, and an azimuth-offset plot for such a survey, respectively.
Figure 4B:
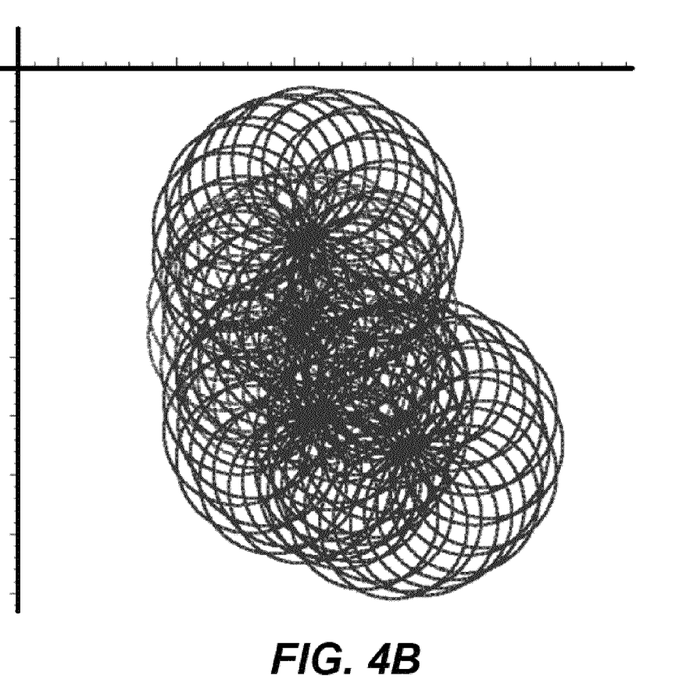
Figure 4C:
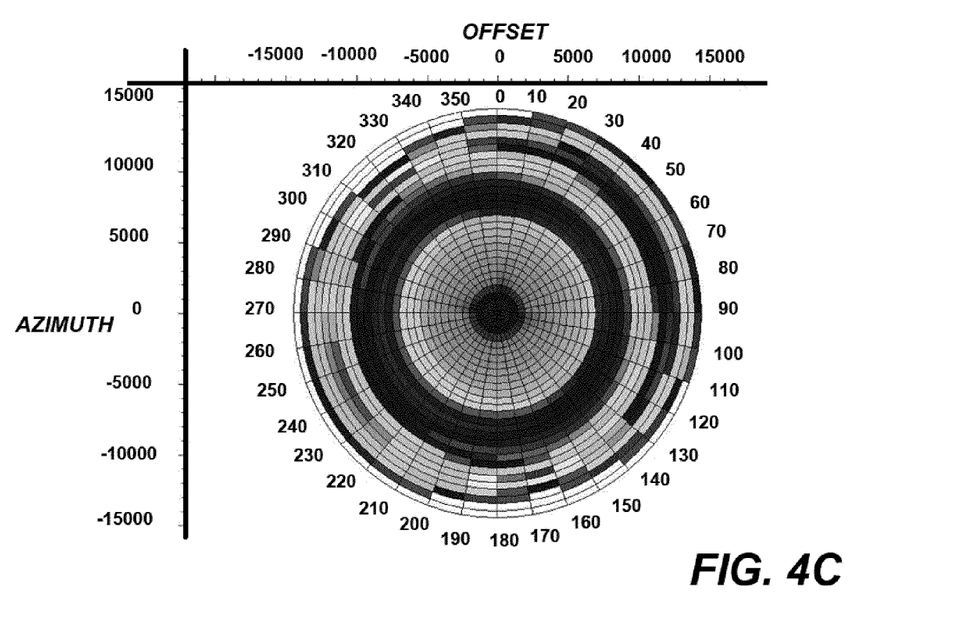

FIG. 4A-FIG. 4C briefly illustrate a multi-vessel coil shoot. FIG. 4A-FIG. 4C are a plan, overhead schematic view of one particular embodiment of a nulti-vessel coil shoot, a computerized rendition of a plan view of the survey area covered by generally circular sail lines of the embodiment of FIG. 4A over time during a shooting and recording survey, and an azimuth-offset plot for such a survey, respectively. The survey spread 400 includes two receiver vessels 100 and two source vessels 102. Accordingly, the spread 400 comprises two streamer arrays 105. Both of the receiver vessels 100 tow a source 110 in this particular embodiment, and so the spread 400 as a whole comprises four sources 110.

The above implementations for a single vessel coil shoot shown in FIG. 2A-FIG. 2C and a multi-vessel coil shoot shown in FIG. 4A-FIG. 4C are but exemplary embodiments and alternative embodiments are plentiful as evident from the disclosure of the two applications cited above. Note that, in both the single vessel and multi-vessel coil shoots described above, the circle centers defining the sail paths 220 are not randomized. They are carefully thought out and preplanned. A great deal of effort is then expended during the survey to control the position of the various survey elements to exerted during the survey to ensure that those elements remain as true to the sail line as can possibly be attained. The presently disclosed technique takes a diametrically opposed approach—it randomizes the distribution of seismic receivers and seismic sources during a coil shoot acquisition. The invention admits variation in how this might be achieved. Two approaches will now be disclosed.

Figure 5:
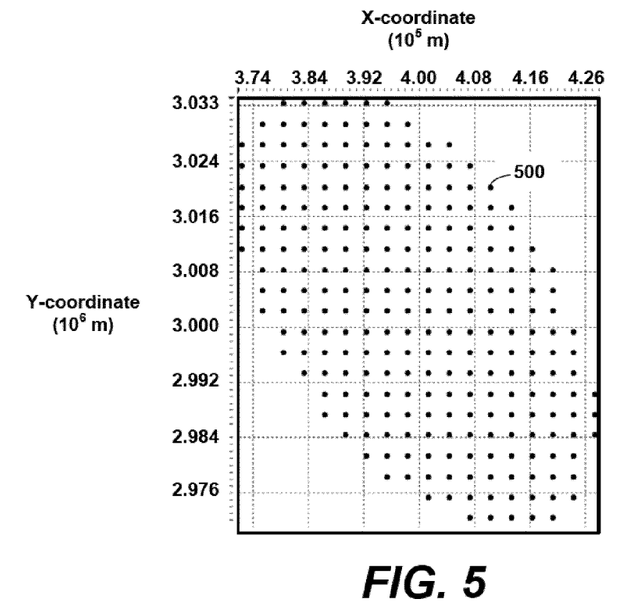
FIG. 5 depicts an exemplary portion of survey plan in which the centers of the circles defining the sail lines are uniformly distributed as in the single vessel survey of FIG. 3A-FIG. 3C and the multi-vessel survey of FIG. 4A-FIG. 4C.

In the coil shoot surveys described above, the preplanned centers of the circles defining the sail lines 220 are uniformly distributed by the control of the increments DX, DY as shown in and discussed relative to FIG. 2B. The circle centers are typically distributed in a regular grid (square, rectangular, hexagonal). FIG. 5 illustrates a regular grid of N circle centers 500 (only one indicted) that covers a given area.

One embodiment of the proposed technique for randomization of the sources consists in randomizing the centers of the circles or ellipse focii, if the ellipse is the curve used in acquisition. Circle center randomization consists in using the method to generate Hammersley points or Halton points as circle centers. Hammersley points and Halton points have been used for quasi-Monte Carlo integration in previous research. The advantage of Hammersley points is that they are uniformly distributed and have a stochastic looking pattern. The points are generated by a deterministic formula. Halton points are similar with Hamersley points but allow incremental sampling. Tien-Tsin Wong, et al., "Sampling with Hammersley and Halton Points", 2 *Journal of Graphics Tools* pp 9-24 (1997).

Figure 6:
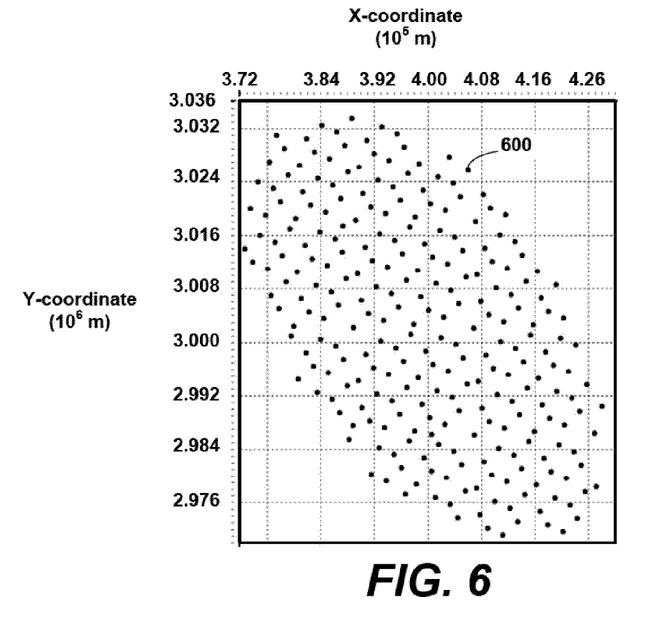
FIG. 6 illustrates the randomization of the centers of the circles defining the sail lines in order to randomize the seismic receiver and seismic source locations during a coil shoot survey in accordance with one particular embodiment of the present invention.

The randomized circle centers can be identified by first determining the number of circles, N, for a certain survey area based on the processing requirements. Once the number N is determined, this number and the coordinates of the corners of survey area (($x_1,y_1$), ($x_2,y_1$), ($x_2,y_2$) and ($x_1,y_2$)) are used to generate N Hammersley or Halton points in (x,y) coordinates. FIG. 6 shows the Hammersley point distribution for the circle centers 600 (only one indicated) corresponding to the regular grid shown in FIG. 5.

Figure 7A:
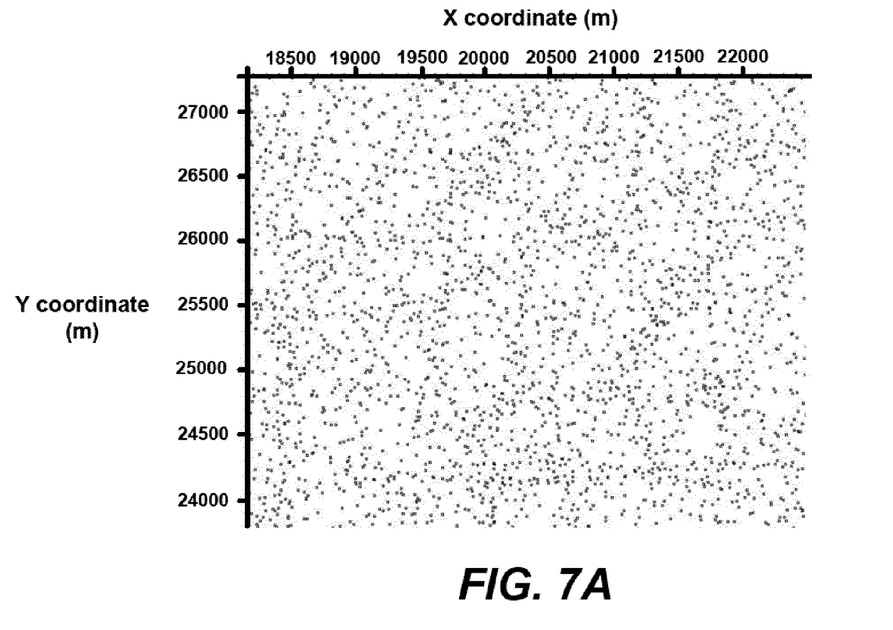
FIG. 7A-FIG. 7B illustrate randomized seismic receiver locations and randomized seismic source locations, respectively, generated by permitting the receives and sources to drift responsive to environmental conditions such as wind and current.
Figure 7B:
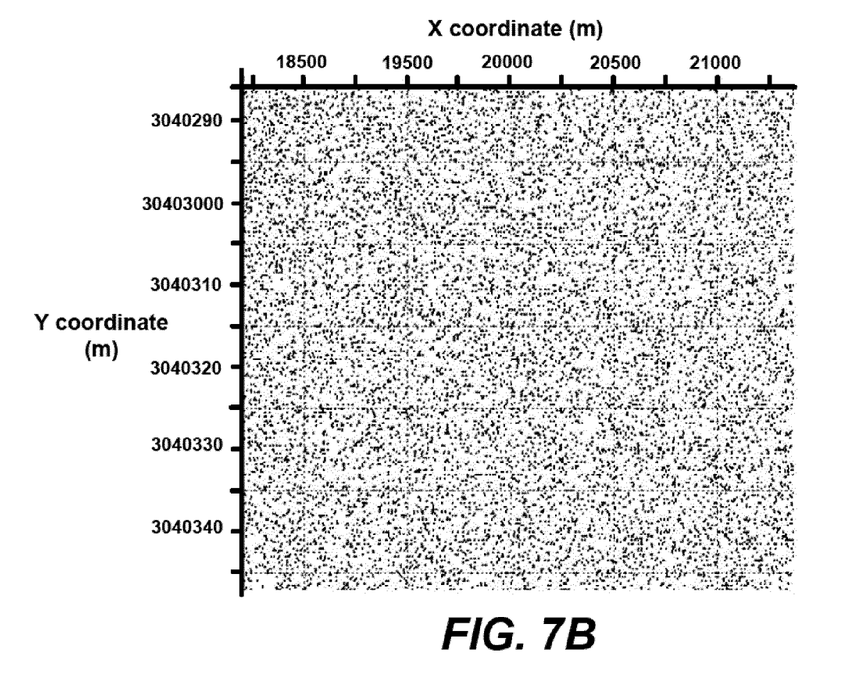

In a second embodiment, the centers of the circles may remain uniformly distributed in the manner illustrated above with respect to FIG. 2A-FIG. 2C and FIG. 4A-FIG. 4C while permitting the streamers 140 in which the seismic receivers 156 are mounted to drift while controlling crossline streamer separation. Thus, the spread controller (not shown) does not steer the streamers 140 to follow the pre-plot sail line; but steers the streamers 140 only to maintain constant streamer separation. Environmental conditions, such as the marine currents, will affect the streamer shape and location of the streamer vs. the pre-plot line and this will randomize the receivers 156. FIG. 7A-FIG. 7B illustrate a random shot distribution and a random receiver distribution, respectively, obtained this way during a coil acquisition shoot.

The presently disclosed technique admits variation in the manner in which the seismic receiver and seismic source locations may be implemented. For example, the two embodiments presented immediately above are not necessarily mutually exclusive and can be combined in various ways in still other embodiments. Other variations may become apparent to those skilled in the art having the benefit of this disclosure.

Figure 8:
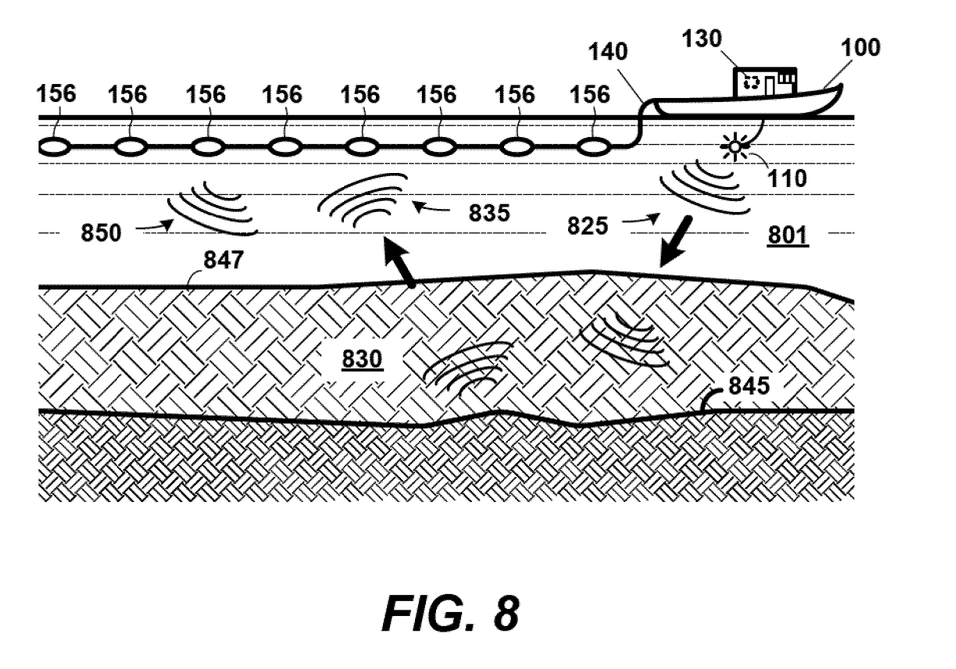
FIG. 8 is a "snapshot" for one of the vessels as it traverses its respective sail line during the acquisition.

FIG. 8 is a "snapshot" during the acquisition described above for a streamer vessel 100 as it traverses its respective sail line 220. For the sake of clarity, and so as not to obscure this aspect of the invention, some detail is omitted. For example, only the receiver vessel 100, streamer array 105, and source 110 are shown because the operation of the other spread elements can readily be extrapolated therefrom. Some elements of the streamer 140, namely the positioning devices, are likewise omitted for the same reason.

FIG. 8 also shows a subterranean geological formation 830. The geological formation 830 presents a seismic reflector 845. As those in the art having the benefit of this disclosure will appreciate, geological formations under survey can be much more complex. For instance, multiple reflectors presenting multiple dipping events may be present. FIG. 8 omits these additional layers of complexity for the sake of clarity and so as not to obscure the present invention.

Still referring to FIG. 8, the seismic source 110 generates a plurality of seismic survey signals 825 in accordance with conventional practice as the survey vessel 100 tows the streamers 140 across the area to be surveyed in predetermined coil pattern described above. The seismic survey signals 825 propagate and are reflected by the subterranean geological formation 830. The receivers 156 detect the reflected signals 835 from the geological formation 830 in a conventional manner. The receivers 156 then generate data representative of the reflections 835, and the seismic data is embedded in electromagnetic signals.

The signals generated by the receivers 156 are communicated to the data collection unit 200. The data collection unit 200 collects the seismic data for subsequent processing. The data collection unit 200 may process the seismic data itself, store the seismic data for processing at a later time, transmit the seismic data to a remote location for processing, or some combination of these things.

The randomization technique disclosed above can be used in other types of marine surveys such as, for example, controlled sources electromagnetic surveys ("CSEM"). In a CSEM survey at least one "vertical" electromagnetic ("EM") source is towed by a marine vessel. EM receivers are also towed by either the same marine vessel or by a different marine vessel. In this manner, the EM source is towed along with the EM receivers through a body of water to perform CSEM surveying.

Figure 9:
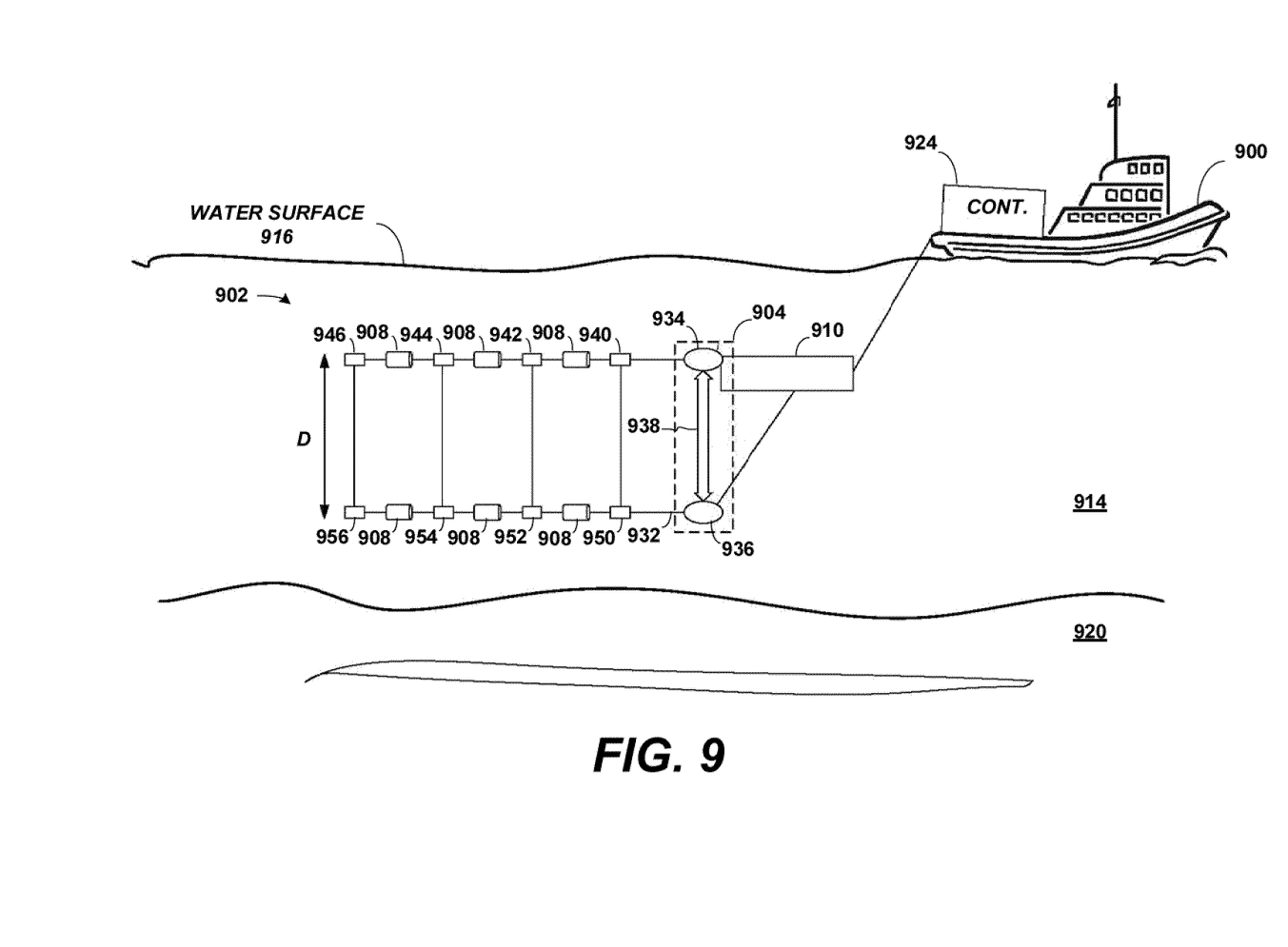
FIG. 9 illustrates a controlled sources electromagnetic survey, according to one particular embodiment.

FIG. 9 shows an exemplary marine survey arrangement that includes a marine vessel 900 that tows an assembly 902 of a vertical EM source 904 (made up of source electrodes 934 and 936), electric field receivers (made up of electrodes 940, 942, 944, 946, 950, 952, 954, and 956), and magnetometers 908. The electric field receivers are used to measure electric fields. The magnetometers 908 (either 1-2-3 components or total field magnetometers) are used to measure magnetic fields. The magnetometers 908 can be used to measure the magnetic fields at various offsets. The electric field receivers and magnetometers collectively are considered EM receivers (for measuring both electrical and magnetic fields).

The electrical cable 930 includes a first source electrode 934, and the cable 932 includes a second source electrode 936, where the source electrodes 934 and 936 are spaced apart by the distance D. The source electrodes 934 and 936 are part of the vertical EM source 904. The source electrodes 934 and 936 are aligned above and below each other such that when a current is passed between them (with the direction of current flow depicted with double arrows 938), a vertical electric dipole is created.

In operation, as the marine vessel 900 tows the assembly 902 through the body of water 914, the controller 924 can send commands to the electronic module 910 to cause activation of the vertical EM source 904. Activation of the vertical EM source 904 causes EM fields according to the TM mode to be generated and to be propagated into the subterranean structure 920. EM signals that are affected by the subterranean structure 920 are detected by the electric field receivers and the magnetometers 908 of the assembly 902. As noted above, the electric field receivers made up of the receiver electrodes 940, 942, 944, 946, 950, 952, 954, and 956 measure the electric fields, with receiver electrodes along each cable measuring horizontal electric fields, and two vertically spaced receiver electrodes on respective cables 930 and 932 measuring vertical electric fields. Also, the magnetometers 908 measure magnetic fields.

The random sampling survey technique disclosed herein can also be employed in a CSEM survey such as that described above. One example of a CSEM survey, including the attendant apparatus, is disclosed and claimed in U.S. application Ser. No. 12/174,179, filed Jul. 15, 2008, incorporated by reference below.

Figure 10:
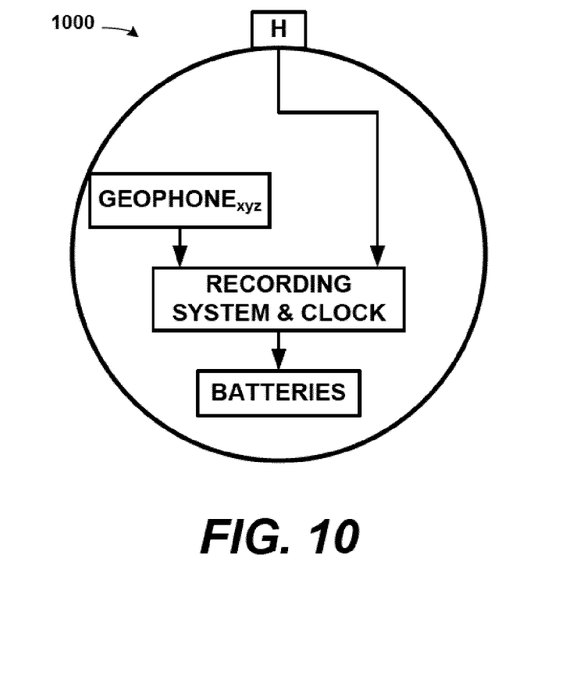
FIG. 10-FIG. 11 illustrate aspects of a conventional seismic node acquisition survey to which the present invention may be applied.
Figure 11:
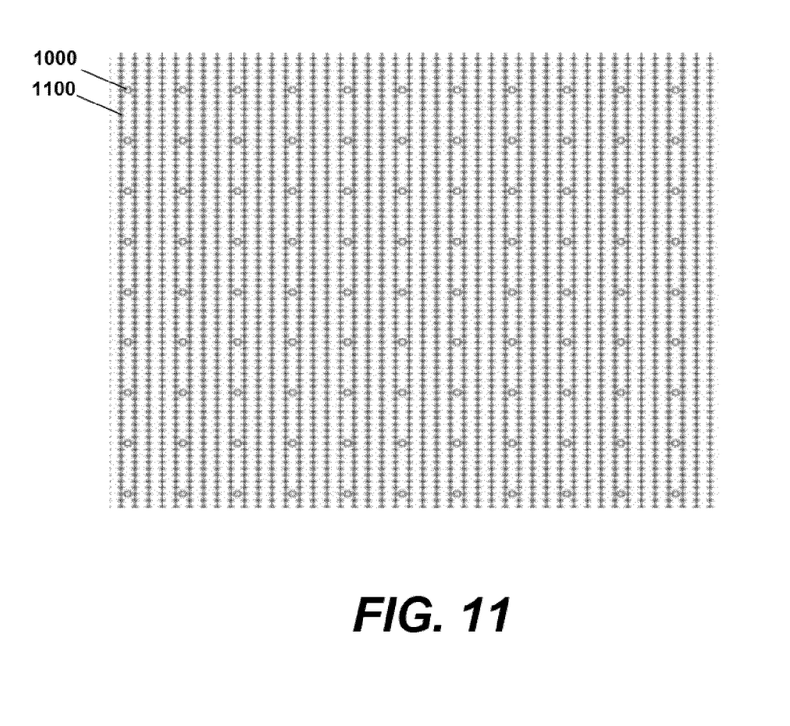

The random sampling acquisition technique disclosed herein can also be applied for what are known as "node acquisition." The nodes are deployed on the ocean bottom, typically with a remotely operated vehicle ("ROV") and can record the pressure field in the water with the hydrophone and the particle motion at the sea floor in x, y, and z directions with three orthogonal geophones (a multicomponent geophone). One example of a generic node 1000 is presented in FIG. 10. As shown in FIG. 11, the nodes 1000 (only one indicated) are deployed in a regular grid with an interval of 400 m. Shot points 1100 (only one indicated) are also shown in FIG. 11. This grid interval of the nodes 1000 is larger than the sampling requirements based on Nyquist criteria. Deployment of the nodes 1000 with a smaller grid interval could be done from a technical perspective, but the acquisition could be very expensive, especially in deep water operations.

The concept of random sampling acquisition described previously can be applied for this type of node acquisition by randomizing the locations of the nodes 1000 to realize the benefits of random sampling acquisition. Randomization can also be achieved randomizing the source locations during shooting as described above. Some embodiments may randomize both source and receiver locations.

The possible benefits of methods of the presently disclosed technique typically become manifest during the processing, although some may be exhibited during the survey.

Possible benefits may include:
 more accurate reconstruction of the seismic wavefield;
 more accurate interpolation of seismic data;
 reduced acquisition footprints on the final migrated data; and
 the possibility to image seismic data using tessellation and weight integration Note that not all embodiments will necessarily exhibit all of the benefits discussed herein. To the extent that various embodiments manifest some of the benefits, not all of them will exhibit them to the same degree.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, ¶6 unless "means for" is explicitly recited together with an associated function. "Means for" clauses are intended to cover the structures described herein as performing the recited function and not only structural equivalents, but also equivalent structures.

As use herein, the phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

The following documents are hereby incorporated by reference for the noted teaching as if set forth herein verbatim:
 Tien-Tsin Wong, et al., "Sampling with Hammersley and Halton Points", 2 *Journal of Graphics Tools* pp 9-24 (1997);
 Gilles Hennenfent & Felix J. Herrmann, "Random Sampling: New Insights Into the Reconstruction of Coarsely-Sampled Wavefields" SEG/San Antonio 2007 Annual Meeting, pp. 2575-2579 (2007);
 Gilles Hennenfent & Felix J. Herrmann, "Simply Denoise: Wavefield Reconstruction Via Jittered Undersampling" 73 Geophysics V19-V28. (2008);

U.S. application Ser. No. 11/335,365, entitled, "Methods and Systems for Efficiently Acquiring Towed Streamer Seismic Surveys", and filed Jan. 19, 2006, in the name of the inventors Nicolae Moldoveanu and Alan Strudley for its teachings regarding the design of circular, coil shoot sail lines;

U.S. application Ser. No. 12/351,156, entitled, "Acquiring Azimuth Rich Seismic Data in the Marine Environment Using a Regular Sparse Pattern of Continuously Curved Sail Lines", and filed Jan. 9, 2009, in the name of the inventors David Ian Hill et al. for its teachings regarding the design of circular, coil shoot sail lines;

U.S. application Ser. No. 12/121,324, entitled "Methods for Efficiently Acquiring Wide-Azimuth Towed Streamer Seismic Data", and filed on May 15, 2008, in the name of the inventors Nicolae Moldoveanu and Steven Fealy for its teachings regarding the design of circular, coil shoot sail lines;

U.S. application Ser. No. 12/174,179, entitled "Surveying Using Vertical Electromagnetic Sources that are Towed Along with Survey Receivers", and filed on Jul. 15, 2008, in the name of the inventors David L. Alumbaugh, et al. for its teachings regarding CSEM surveys;

U.S. Provisional Application Ser. No. 61/180,154, entitled, "Multi-vessel Coil Shooting Acquisition, and filed on May 21, 2009, in the name of the inventors Nicolae Moldoveanu and Steven Fealy (multi-vessel coil shooting);

U.S. Provisional Application Ser. No. 61/218,681, entitled, "Multi-vessel Coil Shooting Acquisition, and filed on Jun. 18, 2009, in the name of the inventors Nicolae Moldoveanu and Steven Fealy (multi-vessel coil shooting); and U.S. application Ser. No. 12/650,268, entitled, "Multi-vessel Coil Shooting Acquisition, and filed on an even date herewith in the name of the inventors Nicolae Moldoveanu and Steven Fealy (multi-vessel coil shooting).

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for a marine seismic acquisition, comprising:
towing a marine seismic spread in a generally curved advancing path over a survey area to form a plurality of generally circular sail paths, wherein the marine seismic spread includes at least one source and a plurality of marine seismic streamers;
permitting the plurality of marine seismic streamers to drift while controlling the crossline streamer separation;
shooting the at least one source while towing the marine seismic spread in the generally curved advancing path; and
recording a plurality of reflections from the survey area.

2. The method of claim 1, wherein centers of the plurality of generally circular sail paths are uniform.

3. The method of claim 1, wherein the plurality of marine seismic streamers deviates from a pre-plot sail line.

4. A method for a marine seismic acquisition, comprising:
towing a marine seismic spread in a generally curved advancing path over a survey area to form a plurality of generally circular sail paths, wherein the marine seismic spread includes at least one source and a plurality of marine seismic streamers having a plurality of marine seismic receivers;
positioning the at least one source in a random manner;
shooting the at least one source while towing the marine seismic spread in the generally curved advancing path; and
recording a plurality of reflections from the survey area.

5. The method of claim 4, wherein both the at least one source and the plurality of marine seismic receivers are positioned in the random manner.

6. The method of claim 4, wherein the at least one source is towed by a first vessel and the plurality of marine seismic streamers are towed by a second vessel different from the first vessel.

7. The method of claim 4, wherein the reflections from the survey area provide a full azimuth survey of the survey area.

8. The method of claim 4, further comprising moving the marine seismic spread in a y-direction (DY) and a roll in an x-direction (DX) while towing the marine seismic spread in the generally curved advancing path.

9. The method of claim 4, wherein DX and DY are functions of the width of the marine seismic spread.

10. A method, comprising:
identifying a desired region;
determining a plurality of generally curved advancing sail paths of a marine seismic spread over the desired region, wherein the marine seismic spread comprises at least one source and a plurality of marine seismic streamers and respective generally curved advancing sail paths in the plurality of generally curved advancing sail paths have a radius that is a function of a width of the marine seismic spread; and
distributing the generally curved advancing sail paths over the desired region in a random manner.

11. The method of claim 10, wherein distributing the generally curved advancing sail paths over the desired region in a random manner comprises distributing the centers of the generally curved advancing sail paths in the random manner.

12. The method of claim 10, wherein the centers of the generally curved advancing sail paths are distributed according to Hammersley points.

13. The method of claim 10, wherein the centers of the generally curved advancing sail paths are distributed according to Halton points.

14. The method of claim 10, wherein the generally curved advancing sail paths are functions of a roll in a y-direction ("DY") and a roll in an x-direction ("DX").

15. The method of claim 10, wherein each of the plurality of generally curved advancing paths is a generally oval path, a generally elliptical path, a figure-eight path, or some combination thereof.

16. The method of claim 10, wherein the radius is a function of a desired coverage fold for the survey area, or a combination of the width of the marine seismic spread and the desired coverage fold.

17. A method for a marine seismic acquisition, comprising:
towing a marine seismic spread in a generally curved advancing path over a survey area to form a plurality of generally circular sail paths, wherein the marine seismic spread includes at least one source and a plurality of marine seismic streamers having a plurality of marine seismic receivers and wherein respective generally curved advancing sail paths in the plurality of generally curved advancing sail paths have a radius that is a function of a desired coverage fold for the survey area;

positioning the at least one source, the plurality of marine seismic receivers or both in a random manner;

shooting the at least one source while towing the marine seismic spread in the generally curved advancing path; and recording a plurality of reflections from the survey area.

* * * * *